(12) United States Patent
Zhang et al.

(10) Patent No.: US 8,790,774 B2
(45) Date of Patent: Jul. 29, 2014

(54) FLUOROELASTOMER NANOCOMPOSITES COMPRISING CNT INORGANIC NANO-FILLERS

(75) Inventors: Qi Zhang, Mississauga (CA); Yu Qi, Oakville (CA); Nan-Xing Hu, Oakville (CA); Gordon Sisler, St. Catharines (CA)

(73) Assignee: Xerox Corporation, Norwalk, CT (US)

( * ) Notice: Subject to any disclaimer, the term of this patent is extended or adjusted under 35 U.S.C. 154(b) by 319 days.

(21) Appl. No.: 12/978,729

(22) Filed: Dec. 27, 2010

(65) Prior Publication Data
US 2012/0163888 A1 Jun. 28, 2012

(51) Int. Cl.
| | |
|---|---|
| G03G 15/20 | (2006.01) |
| B32B 25/04 | (2006.01) |
| B32B 25/08 | (2006.01) |
| B32B 25/14 | (2006.01) |
| B32B 15/06 | (2006.01) |
| B32B 15/082 | (2006.01) |
| B32B 15/085 | (2006.01) |
| B32B 27/06 | (2006.01) |
| B32B 27/08 | (2006.01) |
| B32B 27/18 | (2006.01) |
| B32B 27/20 | (2006.01) |
| B32B 27/28 | (2006.01) |
| B32B 27/30 | (2006.01) |
| B32B 27/36 | (2006.01) |
| C08K 3/04 | (2006.01) |
| C08K 3/10 | (2006.01) |
| C08K 3/14 | (2006.01) |
| C08K 5/02 | (2006.01) |
| C08K 5/06 | (2006.01) |
| C08K 5/541 | (2006.01) |
| C08K 5/5415 | (2006.01) |
| C08K 5/5419 | (2006.01) |

(52) U.S. Cl.
USPC ........... 428/328; 428/323; 428/331; 428/402; 428/403; 428/404; 428/405; 428/421; 428/422; 428/457; 428/461; 428/463; 428/473.5; 428/474.4; 428/476.3; 428/480; 428/483; 428/522; 977/742; 977/753; 399/320; 399/328; 524/404; 524/424; 524/413; 524/443; 524/444

(58) Field of Classification Search
None
See application file for complete search history.

(56) References Cited

U.S. PATENT DOCUMENTS

| | | | | |
|---|---|---|---|---|
| 4,604,424 A | * | 8/1986 | Cole et al. | 524/862 |
| 5,729,813 A | * | 3/1998 | Eddy et al. | 399/333 |
| 5,773,834 A | * | 6/1998 | Yamamoto et al. | 250/423 F |
| 6,090,491 A | * | 7/2000 | Tan et al. | 428/421 |
| 6,114,041 A | * | 9/2000 | Tan et al. | 428/421 |
| 6,890,657 B2 | * | 5/2005 | Pickering et al. | 428/421 |
| 6,946,513 B2 | * | 9/2005 | Higashino et al. | 524/544 |
| 7,214,423 B2 | * | 5/2007 | Finn et al. | 428/335 |
| 7,378,040 B2 | * | 5/2008 | Luo et al. | 252/500 |

(Continued)

FOREIGN PATENT DOCUMENTS

JP 2010-092046 * 4/2010

*Primary Examiner* — Vivian Chen
(74) *Attorney, Agent, or Firm* — MH2 Technology Law Group LLP

(57) ABSTRACT

Exemplary embodiments provide materials and methods for a nanocomposite material and a fuser member containing the nanocomposite material in a fusing system, wherein the nanocomposite material can contain a plurality of carbon nanotubes (CNTs) and a plurality of inorganic nano-fillers (INFs) disposed in a polymer matrix to provide the nanocomposite material with desirable properties.

20 Claims, 2 Drawing Sheets

(56) References Cited

U.S. PATENT DOCUMENTS

| | | | |
|---|---|---|---|
| 7,544,387 B2* | 6/2009 | Bloom | 427/212 |
| 7,732,029 B1* | 6/2010 | Moorlag et al. | 428/36.9 |
| 7,754,408 B2* | 7/2010 | Kumar et al. | 430/111.31 |
| 7,837,892 B2* | 11/2010 | Pridoehl et al. | 252/62.54 |
| 7,879,450 B2* | 2/2011 | Matsuda et al. | 428/447 |
| 7,991,340 B2* | 8/2011 | Qi et al. | 399/333 |
| 8,086,154 B2* | 12/2011 | Law et al. | 399/282 |
| 8,099,035 B2* | 1/2012 | Qi et al. | 399/333 |
| 2003/0191234 A1* | 10/2003 | Osawa et al. | 524/588 |
| 2006/0292360 A1* | 12/2006 | Hays et al. | 428/323 |
| 2008/0152896 A1* | 6/2008 | Moorlag et al. | 428/323 |
| 2009/0110453 A1* | 4/2009 | Kuntz et al. | 399/333 |
| 2009/0123185 A1* | 5/2009 | Lin et al. | 399/176 |
| 2010/0055450 A1* | 3/2010 | Qi et al. | 428/336 |
| 2010/0055589 A1* | 3/2010 | Qi et al. | 430/71 |
| 2010/0086787 A1* | 4/2010 | Qi et al. | 428/421 |
| 2010/0124661 A1* | 5/2010 | Moorlag et al. | 428/421 |
| 2010/0124662 A1* | 5/2010 | Moorlag et al. | 428/421 |
| 2010/0137499 A1* | 6/2010 | Moorlag et al. | 524/496 |
| 2010/0183348 A1* | 7/2010 | Law et al. | 399/333 |
| 2010/0183864 A1* | 7/2010 | Qi et al. | 428/319.1 |
| 2010/0189943 A1* | 7/2010 | Qi et al. | 428/36.4 |
| 2010/0286327 A1* | 11/2010 | Moorlag et al. | 524/496 |

* cited by examiner

FLUOROELASTOMER NANOCOMPOSITES COMPRISING CNT INORGANIC NANO-FILLERS

DETAILED DESCRIPTION

1. Field of the Use

The present teachings relate generally to composite materials and, more particularly, to fluoroelastomer nanocomposites including carbon nanotubes (CNTs) and inorganic nano-fillers (INFs).

2. Background

Conventional electrophotographic imaging processes typically include forming a visible toner image on a support surface (e.g., a sheet of paper). The visible toner image is often transferred from a photoreceptor that contains an electrostatic latent image and is usually fixed or fused onto the support surface using a fuser to form a permanent image.

In current electrophotographic processes, one major type of fuser outermost materials includes fluoroelastomers, for example, VITON® from E.I. DuPont de Nemours, Inc. (Wilmington, Del.). VITON® fluoroelastomers are used to provide the fusers mechanical flexibility with an ability to absorb shock energy. Also, VITON® fluoroelastomers allow high speed operation. Problems arise, however, due to insufficient mechanical strength and low wear resistance of the VITON® materials.

Conventional approaches for solving these problems include adding fillers into the fuser outermost materials. The fillers include carbon black, metal oxides, and carbon nanotubes (CNTs). However, the mechanical robustness and wear resistance still need to be improved in order to extend the short operating lifetime of conventional fusers. Additionally, it is desirable to improve surface heat transfer of conventional fusers for better surface heat uniformity and to reduce the fusing energy consumption while the mechanical strength and other desirable properties are maintained.

Thus, there is a need to overcome these and other problems of the prior art and to provide nanocomposite materials suitable for use in fusing systems.

SUMMARY

According to various embodiments, the present teachings include a fuser member having a nanocomposite material disposed over a substrate. The nanocomposite material can include a plurality of carbon nanotubes (CNTs) and a plurality of inorganic nano-fillers (INFs) disposed in a fluoroelastomer matrix. The plurality of INFs can be present in an amount ranging from about 2% to about 50% by weight of the total nanocomposite material to provide the nanocomposite material with a thermal conductivity of about 0.2 W/m·K to about 4 W/m·K.

According to various embodiments, the present teachings also include a fuser member including an outermost layer disposed over a substrate. The outermost layer can include a plurality of CNTs and a plurality of INFs disposed in a fluoroelastomer matrix. The plurality of CNTs can be present in an amount ranging from about 0.1% to about 25% and the plurality of INFs can be present in an amount ranging from about 1% to about 80% by weight of the total outermost layer.

According to various embodiments, the present teachings further include a method of making a fuser member. In this method, a first nanocomposite can be formed to include CNTs uniformly dispersed in a fluoroelastomer. A second nanocomposite can then be formed by compounding the first nanocomposite with one or more of the fluoroelastomer, the CNTs, and INFs such that the CNTs and INFs are uniformly dispersed in the fluoroelastomer with controllable concentrations. The compounding process can be performed with a high shear stress at high temperatures. A composite dispersion for forming the coating layer can be formed by dissolving the second nanocomposite in an effective solvent together with one or more of a corresponding curing agent, a metal oxide, and a surfactant. The composite dispersion can then be applied to a surface and cured to form a coating layer on the surface. The CNTs can be present in an amount ranging from about 0.1% to about 25%, and the plurality of INFs can be present in an amount ranging from about 1% to about 80%, by weight of the total coating layer.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide a nanocomposite material and a fuser member containing the nanocomposite material and methods for forming and using the nanocomposite material in a fusing system. In one embodiment, the nanocomposite material can be an elastomeric nanocomposite material containing a plurality of carbon nanotubes (CNTs) and a plurality of inorganic nano-fillers (INFs) disposed in a polymer matrix.

For illustrative purposes, the term "fuser member" is used throughout the application, although it is intended that the term "fuser member" also encompasses other members useful for an electrophotographic printing process including, but not limited to, a fixing member, a pressure member, a heat member and/or a donor member. The fuser member can be in a form of, for example, a belt, a plate, a sheet, a roll, a cylinder, a drum, a drelt, and/or the like.

Figure 1A:
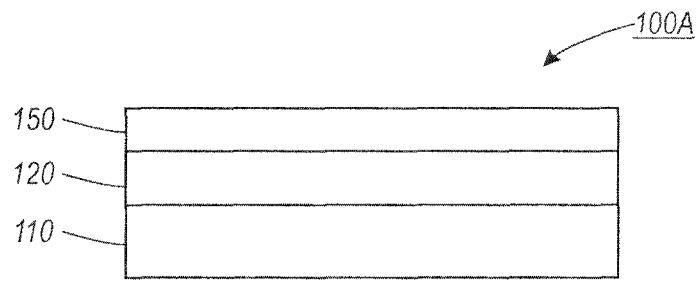
FIGS. 1A-1B depict a portion of exemplary fuser members in accordance with various embodiments of the present teachings.
Figure 1B:
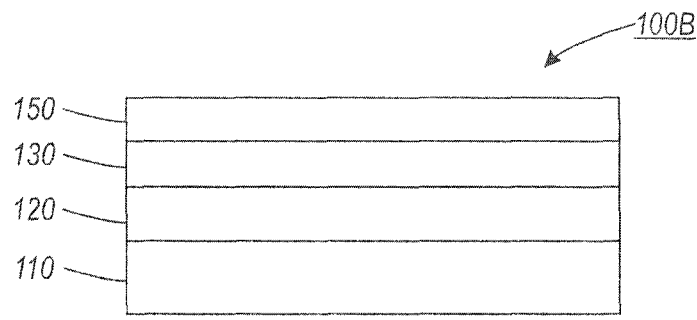

FIGS. 1A-1B depict a portion of exemplary fuser members 100A-B in accordance with various embodiments of the present teachings. It should be readily apparent to one of ordinary skill in the art that the member 100A or 100B depicted in FIGS. 1A-1B represents a generalized schematic illustration and that other components/layers/particles can be added or existing components/layers/particles can be removed or modified.

As shown, the fuser member 100A, 100B can include a substrate 110, and a nanocomposite material 150 disposed over the substrate 110. In embodiments, one or more functional layers can be formed there-between. In an embodiment shown in FIG. 1A, a resilient layer 120 can be formed between the nanocomposite material 150 and the substrate 110. In an embodiment shown in FIG. 1B, an intermediate layer 130 can be disposed between the resilient layer 120 and the nanocomposite material 150. Other desired functional layers can also be included in the fuser member 100A-B including, for example, an adhesion layer disposed between layers of FIGS. 1A-1B.

The substrate 110 can be in a form of, for example, a belt, a plate, a roll, a cylindrical drum and/or a drelt for the disclosed fuser members 100. In various embodiments, the substrate 110 can include a wide variety of materials, such as, for example, metals, metal alloys, rubbers, glass, ceramics, plastics, or fabrics. In an additional example, the metals can include aluminum, anodized aluminum, steel, nickel, copper, and mixtures thereof, while the plastics used can include polyimide, polyester, polyetheretherketone (PEEK), poly (arylene ether), polyamide, and/or a mixture thereof. In certain embodiments, the substrate 110 can include, e.g., aluminum cylinders or aluminum fuser roils.

As shown in FIGS. 1A-1B, the resilient layer 120 can include, for example, a silicone rubber layer, while the intermediate layer 130 can include, for example, silanes, such as an amine modified silane including, e.g., aminopropyltriethoxy-silane (A1100 from OSI Specialties, Friendly, W. Va.), titanates, zirconates, aluminates, and the like, and mixtures thereof, depending on specific applications. The intermediate layer can be coated on the substrate or a second intermediate layer to a thickness of from about 2 nanometers to about 2,000 nanometers, or from about 2 nanometers to about 500 nanometers. It can be coated by any suitable, known technique including, e.g., spray coating or wiping. The intermediate layer 130 can facilitate the film quality of the resilient layer 120 and/or the nanocomposite material 150. In various embodiments, materials and/or methods for the resilient layer and/or the intermediate layer of conventional fuser members can be encompassed for the disclosed fuser member 100.

The nanocomposite material 150 can include CNTs and INFs disposed in a polymer matrix. As used herein, the "polymer matrix" can include one or more chemically or physically cross-linked polymers, such as, for example, fluoroelastomers, thermoelastomers, polyperfluoroether elastomers, silicone elastomers, or other cross-linked materials. The one or more cross-linked polymers can be semi-soft and/or molten to mix with the CNTs and INFs.

The fluoroelastomers can include, e.g., a monomeric repeating unit selected from the group consisting of tetrafluoroethylene, perfluoro(methyl vinyl ether), perfluoro(propyl vinyl ether), perfluoro(ethyl vinyl ether), vinylidene fluoride, hexafluoropropylene, and a mixture thereof. The fluoroelastomers can also include a curing site monomer, e.g., for reacting with curing agents.

Commercially available fluoroelastomers can include, for example, VITON® A: copolymers of hexafluoropropylene (HFP) and vinylidene fluoride (VDF or VF2); VITON® B: terpolymers of tetrafluoroethylene (TFE), vinylidene fluoride (VDF) and hexafluoropropylene (HFP); VITON® GF: tetrapolymers of TFE, VF2, HFP); as well as VITON® E; VITON® E-60C; VITON® E430; VITON® 910; VITON® GH; and VITON® GF. The VITON® designations are Trademarks of E.I. DuPont de Nemours, Inc. (Wilmington, Del.) and are also referred herein as "VITON."

Other commercially available fluoroelastomers can include those available from 3M Corporation (St. Paul, Minn.) including, for example, DYNEON™ fluoroelastomers, AFLAS® fluoroelastomers (e.g., a poly(propylene-tetrafluoroethylene)), and FLUOREL® fluoroelastomers (e.g. FLUOREL®II (e.g., LII900) a poly(propylene-tetrafluoroethylenevinylidenefluoride), FLUOREL® 2170, FLUOREL® 2174, FLUOREL® 2176, FLUOREL® 2177, and/or FLUOREL® LVS 76. Additional commercially available fluoroelastomer materials can include the "tecnoflons" identified as FOR®-60KIR, FOR®-LHF, FOR®-NM, FOR®-THF, FOR®-TFS, FOR®-TH, and FOR®-TN505, available from Solvay Solexis (West Deptford, N.J.).

In embodiments, the polymer matrix 110 can include polymers cross-linked with an effected curing agent (also referred to herein as cross-linking agent or cross-linker) to form elastomers that are relatively soft and display elastic properties. For example, when the polymer matrix uses a vinylidene-fluoride-containing fluoroelastomer, the curing agent can include, a bisphenol compound, an diamino compound, an aminophenol compound, an amino-siloxane compound, an amino-silane, and/or a phenol-silane compound. An exemplary bisphenol cross-linker can be VITON® Curative No. 50 (VC-50) available from E.I. du Pont de Nemours, Inc. VC-50 can be soluble in a solvent suspension and can be readily available at the reactive sites for cross-linking with, for example, VITON®-GF (E.I. du Pont de Nemours, Inc.).

As used herein and unless otherwise specified, the term "nanotubes" refers to elongated materials (including organic and inorganic materials) having at least one minor dimension, for example, width or diameter, of about 1000 nanometers or less. Although the term "nanotubes" is used herein for illustrative purposes, it is intended that the term also encompasses other elongated structures of like dimensions including, but not limited to, nanoshafts, nanopillars, nanowires, nanorods, and nanoneedles and their various functionalized and derivatized fibril forms, which include nanofibers with exemplary forms of thread, yarn, fabrics, etc.

The nanotubes can also include single wall carbon nanotubes (SWCNTs), double-wall carbon nanotubes (DWCNTs), multi-wall carbon nanotubes (MWCNTs), and their various functionalized and derivatized fibril forms such as carbon nanofibers. In various embodiments, the nanotubes can have an inside diameter and an outside diameter. For example, the average inside diameter can range from about 1 nanometer to about 20 nanometers, or from about 2 nanometers to about 10 nanometers, from about 3 nanometers to about 8 nanometers; while the average outside diameter can range from about 5 nanometers to about 100 nanometers, or from about 10 nanometers to about 50 nanometers, or from about 8 nanometers to about 15 nanometers. Alternatively, the nanotubes can have an average aspect ratio ranging from about 10 to about 1,000,000, or from about 20 to about 1000, from about 30 to about 500.

As disclosed herein, the inorganic nano-fillers (INFs) can have at least one minor dimension, e.g., width or diameter, for example, ranging from about 5 nanometers to about 1000 nanometers, or from about 20 nanometers to about 500 nanometers, or from about 30 nanometers to about 50 nanometers. The inorganic nano-fillers can include e.g., silicon carbides, boron nitrides, boron carbides, aluminum nitrides, titanium nitrides, titanium carbides, zirconium carbides, alumina, etc. In an exemplary embodiment, the filler particle surface can have functional groups, such as —OH and —NH$_2$, to improve compatibility with organic solvents and polymers, the dispersive properties can thus be improved.

The CNTs and/or the INFs (i.e., CNTs/INFs) can have various cross sectional shapes, such as, for example, rectangular, polygonal (e.g., hexagonal), oval, or circular shape or have a shape of wire or whisker with high aspect ratio. Accordingly, the CNTs/INFs can have, for example, cylindrical 3-dimensional shapes.

The CNTs/INFs can be modified/functionalized CNTs/INFs with controlled and/or increased thermal, mechanical, electrical, and/or surface properties through various physical and/or chemical modifications. For example, each of the CNTs/INFs can be surface-modified with a material chosen from perfluorocarbon, perfluoropolyether, and/or polydimethylsiloxane.

Figure 2:
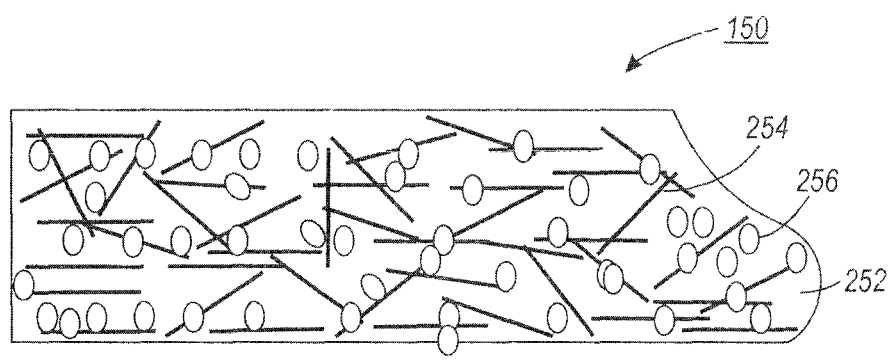
FIG. 2 depicts an exemplary nanocomposite material in accordance with various embodiments of the present teachings.

FIG. 2 shows an exemplary nanocomposite material 150 used as an outermost layer of the fuser members 100A-B of FIGS. 1A-1B in accordance with various embodiments of the present teachings. As shown in FIG. 2, although the nanotubes 254 or the nano-fillers 256 are depicted having a consistent size or shape, one of ordinary skill in the art will understand that the nanotubes 254 can have various shapes and sizes (e.g., length, width, or diameter), and the nano-fillers 256 can have various shapes and sizes (e.g., length, width, or diameter).

As shown, CNTs 254 and INFs 256 can both be disposed within an exemplary polymer matrix 252. In this illustrated embodiment, the CNT distribution can include bundled carbon nanotubes 254 dispersed uniformly but with random tangles throughout the polymer matrix 252. In some cases, the CNTs 254 can be dispersed uniformly and/or spatially-controlled, for example, be aligned or oriented at certain directions, throughout the polymer matrix 252 by, for example, use of magnetic field. Likewise, INFs 256 can also be dispersed randomly, uniformly, and/or spatially-controlled in the polymer matrix 252.

In embodiment, the nanotubes 254 can be dispersed in the polymer matrix having a weight loading of, for example, from about 0.1% to about 25% by weight, or about 1% to about 10% by weight, or about 2% to about 5% by weight of the nanocomposite material 150. The INFs 256 can be dispersed in the polymer matrix having a weight loading of, for example, about 1% to about 80% by weight, or about 2% to about 50% by weight, or about 5% to about 20% by weight of the total nanocomposite material 150.

The combination of CNTs 254 and INFs 256 disposed in the polymer matrix 252 can provide synergetic effect and can provide the nanocomposite material 150 with desirable properties including, for example, thermal (e.g., stability or conductivity), mechanical (e.g., tensile strength, toughness, wear resistance, or ultimate strength), electrical (e.g., conductivity), and/or surface functional properties.

For example, the nanocomposite material 150 containing both CNTs 254 and INFs 256 can have a thermal conductivity ranging from about 0.1 W/m·K to about 6 W/m·K; or from about 0.2 W/m·K to about 4 W/m·K, or from about 0.4 W/m·K to about 2 W/m·K; a surface resistivity ranging from about 0.1×10$^4$ Ω/sq to about 1×10$^8$ Ω/sq, or from about 0.5×10$^4$ Ω/sq to about 1.5×10$^8$ Ω/sq, or from about 0.8×10$^4$ Ω/sq to about 1.5×10$^4$ Ω/sq; and/or a surface energy ranging from about 18 mN/m$^2$ to about 25 mN/m$^2$, or from about 19 mN/m$^2$ to about 24 mN/m$^2$, or from about 20 mN/m$^2$ to about 21 mN/m$^2$, wherein the surface free energy can be calculated, e.g., by using Lewis Acid-Base method from the results of the contact angle measurement using Fibro DAT1100 instrument (Fibro Systems AB, Sweden).

The nanocomposite material 150 containing CNTs 254 and INFs 256 can have improved mechanical properties including a tensile strength ranging from about 600 psi to about 5000 psi, or from about 800 psi to about 3000 psi, or from about 1000 psi to about 2500 psi; a toughness ranging from about 1000 in·lbf/in$^3$ to about 5000 in·lbf/in$^3$, or from about 1500 in·lbf/in$^3$ to about 4000 in·lbf/in$^3$, or from about 2200 in·lbf/in$^3$ to about 3500 in·lbf/in$^3$; and/or a percentage ultimate strain in the range of about 100% to about 600%, or from about 150% to about 500%, or from about 250% to about 400% using, for example, a universal Instron testing machine (Instron, Norwood, Mass.).

Methods for forming the fuser member 100A-B are also provided in accordance with various embodiments of the present teachings. For example, a composite dispersion containing polymer/CNT/INF can be prepared to form the disclosed nanocomposite material 150 as a coating layer.

Specifically, the composite dispersion can be formed by, e.g., a let-down method involving a compounding process. As disclosed herein, the term "compounding" refers to a mixing process that involves high shear stress at high temperatures for a period of time. For example, the high shear stress can be in the range from about 1500 mg torque to about 2400 mg torque, or from about 1600 mg torque to about 2200 mg torque, or from about 1800 mg torque to about 2000 mg torque. The high temperature can be in the range from about 120° C. to about 200° C., or from about 150° C. to about 180° C., or from about 160° C. to about 170° C.

To form the exemplary composite dispersion, a first nanocomposite can be formed to include CNTs uniformly dispersed in a fluoroelastomer (e.g., VITON). A second nanocomposite can then be formed by compounding the first nanocomposite with one or more of fluoropolymers, CNTs, and/or INFs (e.g., SiC and/or BN). Such let-down methods can control concentrations of each of the fluoropolymers, CNTs, and/or INFs, which, in embodiments, can be uniformly dispersed within the second nanocomposite.

The composite dispersion for forming the disclosed nanocomposite material 150 can then be formed by dispersing the second nanocomposite in an effective solvent together with corresponding curing agents, metal oxides, and/or surfactants. Effective solvents can include, but are not limited to, methyl isobutyl ketone (MIBK), acetone, methyl ethyl ketone (MEK), and mixtures thereof. Other solvents that form suitable dispersions can be within the scope of the embodiments herein.

Various layer-forming techniques including, coating techniques, extrusion techniques, and/or molding techniques, can be applied to form the nanocomposite material 150 on the substrate 110, or on the resilient layer 120, or on the intermediate layer 130, or on other desirable functional layer that is formed over the substrate 110 (see FIGS. 1A-1B). In embodiments, the composite dispersion for forming the nanocomposite material 150 can be applied by dip coating, painting, brush coating, roller coating, pad application, spray coating, spin coating, casting, and/or flow coating. For example, gap coating can be used to coat a flat substrate, such as a belt or plate, whereas flow coating can be used to coat a cylindrical substrate, such as a drum or a fuser roll substrate.

Following the application of the composite dispersion, a curing process can be conducted including, e.g., evaporation, irradiation, drying, hardening, and/or thickening process. The curing process can be determined by the polymer(s) and the curing agent(s) used. In exemplary embodiments, the curing process for forming the nanocomposite material 150 can include, for example, a step-wise curing process. For example, a coated/extruded/molded CNT/INF/polymer composite dispersion can be placed in a convection oven at about 49° C. for about 2 hours; the temperature can be increased to about 177° C. and further curing can take place for about 2 hours; the temperature can be increased to about 204° C. and the coating can further be cured at that temperature for about 2 hours; and lastly, the oven temperature can be increased to about 232° C. and the coating can be cured for another 6 hours. Other curing schedules can be possible. Curing schedules known to those skilled in the art can also be within the scope of embodiments herein.

The formed nanocomposite material 150 of the fuser member 100A-B can have a thickness ranging from about 5 microns to about 100 microns, or from about 10 microns to about 60 microns, or from about 20 microns to about 30 microns.

Figure 3:
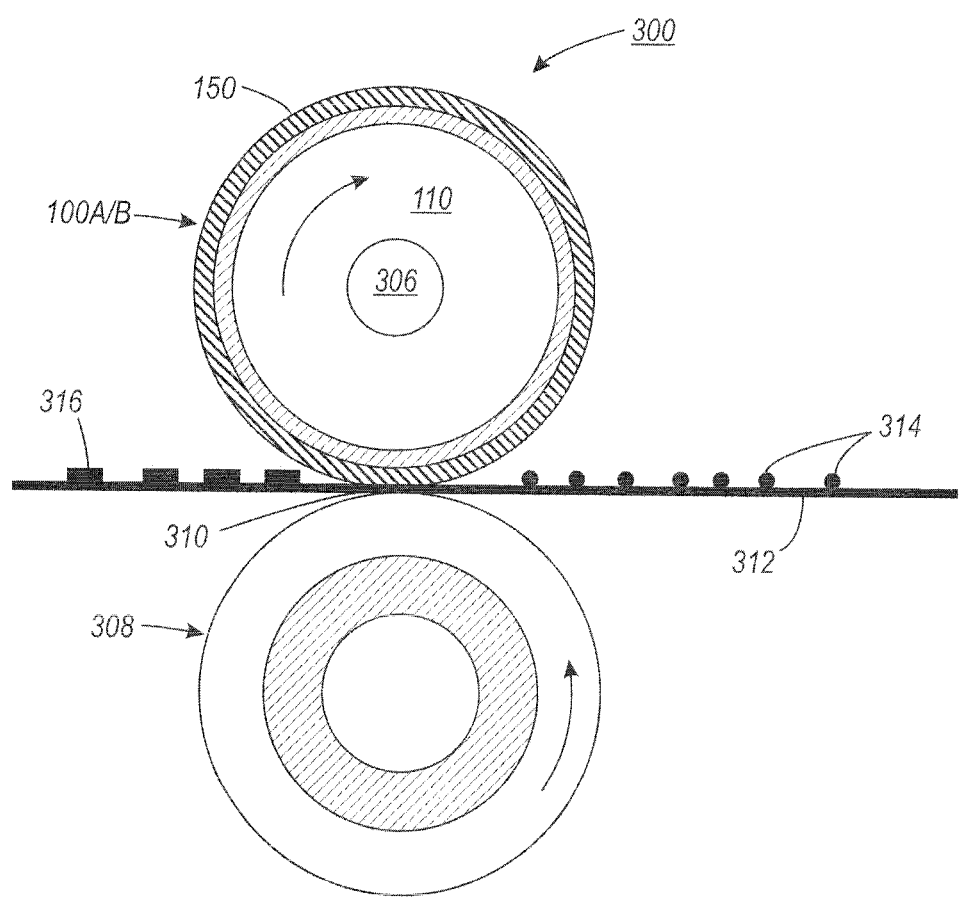
FIG. 3 depicts an exemplary fusing system using the members of FIGS. 1A-1B in accordance with various embodiments of the present teachings.

In one embodiment, the exemplary fuser member 100A-B can be used in a fusing system to improve fusing performances and final printing quality as disclosed herein. FIG. 3 depicts an exemplary fusing system 300 using the disclosed member 100A or 100B of FIGS. 1A-1B.

The exemplary system 300 can include the exemplary fuser roll 100A or 100B having a nanocomposite material 150 as an outermost layer over a suitable substrate 110. The substrate 110 can be, for example, a hollow cylinder fabricated from any suitable metal. The fuser roll 100 can further include a suitable heating element 306 disposed in the hollow portion of the substrate 110 which is coextensive with the cylinder. Backup or pressure roll 308, as known to one of ordinary skill in the art, can cooperate with the fuser roll 100 to form a nip or contact arc 310 through which a print medium 312 such as a copy paper or other print substrate passes, such that toner images 314 on the print medium 312 contact the nanocomposite material 150 during the fusing processes. Optionally, a pressure can be applied during the fusing process by the backup or pressure roll 308. Following the fusing process, after the print medium 312 passing through the contact arc 310, fused toner images 316 can be formed on the print medium 312.

In embodiments, the fuser member 100 can have improved thermal conductivity, reduced surface energy, and improved wear resistance when constantly contacting and fusing toner chemicals at high temperatures. In embodiments, the nanocomposite material 150 containing CNTs 254 and INFs 256 of the fuser member 100 can have high thermal stability.

As used herein, unless otherwise specified, the term "thermal stability" refers to property stability of a material at certain temperatures for a certain time length. As used herein, the term "high thermal stability" or "thermally stable" means that the material's properties (e.g., thermal conductivity, surface resistivity, surface energy, and/or mechanical properties) are stable and remain substantially unchanged at high temperatures for a certain time length, e.g., for at least about 30 minutes. As used herein, the term "high temperature" refers to a temperature that is about 160° C. or higher. For example, the toner can be fused at a temperature ranging from about 150° C. to about 200° C., or from about 155° C. to about 190° C., or from about 160° C. to about 180° C. with desired fusing performance and printing quality by using the disclosed nanocomposite material.

EXAMPLES

Example 1

Preparation of a CNT/Nano Filler/VITON Composite

About 12.5 grams of CNT master batch (containing 12 weight % of multi-walled CNTs in VITON GF), about 2.5 grams BN (about 70 nm in diameter or width) and about 35 grams of VITON GF (available from E.I. du Pont de Nemours, Inc.) were heated to about 170° C. and mixed using an internal compounder, such as HAAKE Rheomix at a rotor speed of about 20 revolutions per minute (rpm) for about 20 minutes to form about 50 grams of polymer composite containing about 5 weight percent of BN, 3 weight percent of carbon nanotubes. Different loadings of BN and/or SiC were prepared by this extrusion let-down process.

Example 2

Preparation of a CNT/BN/VITON Coating Composite

A CNT/BN/VITON coating dispersion was prepared by mixing the let-down CNT/BN/VITON composite prepared from Example 1 with the metal oxides (magnesium oxide and/or calcium hydroxide), and the bisphenol VC-50 curing agent (VITON® Curative No. 50 available from E.I. du Pont de Nemours, Inc.) in methyl isobutyl ketone (MIBK). The resulting coating dispersion was then coated onto a suitable fuser roll substrate by, e.g., a flow coating technique, or casting in a mold. The coating was allowed to evaporate most of the solvent, followed by curing at ramp temperatures, e.g., at about 149° C. for about 2 hours, and at about 177° C. for about 2 hours, then at about 204° C. for about 2 hours, and then at about 232° C. for about 6 hours for a post cure.

The resulting CNT/BN/VITON composite coatings or coated layers exhibited high tensile strength and toughness compared with the VITON without CNT or BN. The tensile strength was higher with increased level of fillers. Table 1 shows such comparison III accordance with the present teachings. Note that, the toughness described in Table 1 is determined by an integral average stress/strain at the break point, that is, the area under the stress-strain curve is considered to be a measure for the toughness as known to one of ordinary skill in the art.

Example 3

Preparation of a CNT/SiC/VITON Coating Composite

A CNT/SiC/VITON coating dispersion was prepared by mixing the let-down CNT/SiC/VITON composite prepared from Example 1 with the metal oxides (magnesium oxide and/or calcium hydroxide), and the bisphenol VC-50 curing agent (VITON® Curative No. 50 available from E.I. du Pont de Nemours, Inc.) in methyl isobutyl ketone (MIBK). The composite coatings were obtained by using the same coating technique and curing process described in Example 2. The resulting CNT/SiC/VITON composite coatings or coated layers exhibited high tensile strength and toughness compared with the VITON without CNT and/or SiC. The tensile strength became higher with increased level of fillers as shown in Table 1.

TABLE 1

| CNTs/INFs | | Filler Level | Tensile stress at max. load (psi) | Tensile strain at max. load (%) | Modulus (psi) | Toughness |
|---|---|---|---|---|---|---|
| VITON Control | | 0 | 599 | 178 | 463 | 580 |
| CNT (3%) | BN (70 nm) | 5 | 1296 | 333 | 579 | 2203 |
| | | 20 | 1614 | 341 | 996 | 3145 |
| | BN (500 nm) | 5 | 1397 | 390 | 459 | 2656 |
| | | 20 | 1646 | 373 | 975 | 3448 |
| | SiC (<100 nm) | 5 | 1382 | 333 | 517 | 2245 |
| | | 20 | 2143 | 286 | 1152 | 3291 |

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A fuser member comprising:
a nanocomposite material disposed over a substrate, the nanocomposite material comprising:
a plurality of carbon nanotubes (CNTs) and a plurality of inorganic nano-fillers (INFs) disposed in a fluoroelastomer matrix, wherein the plurality of INFs is present in an amount ranging from about 2% to about 50% by weight of the total nanocomposite material to provide the nanocomposite material with a thermal conductivity of about 0.2 W/m·K to about 4 W/m·K,
wherein the INFs are selected from the group consisting of silicon carbides, boron nitrides, boron carbides, aluminum nitrides, titanium nitrides, titanium carbides, zirconium carbides, and combinations thereof, and
wherein each of the plurality of INFs comprises a surface modified with a mixture of two or more of a perfluorocarbon, a perfluoropolyether, or a polydimethylsiloxane.

2. The member of claim 1, wherein a surface of each of the plurality of INFs comprises a functional group selected from the group consisting of —OH, —NH$_2$, and a combination thereof.

3. The member of claim 1, wherein the plurality of INFs has at least one dimension ranging from about 5 nanometers to about 1000 nanometers.

4. The member of claim 1, wherein the plurality of CNTs is present in an amount ranging from about 0.1% to about 25% by weight of the total nanocomposite material.

5. The member of claim 1, wherein the plurality of CNTs comprises single-wall carbon nanotubes (SWCNTs), double-wall carbon nanotubes (DWCNTs), multi-wall carbon nanotubes (MWCNTs), and combinations thereof.

6. The member of claim 1, wherein the plurality of CNTs has an average inside diameter ranging from about 1 nanometer to about 20 nanometers, an average outside diameter ranging from about 5 nanometers to about 100 nanometers, and an average aspect ratio ranging from about 10 to about 1,000,000.

7. The member of claim 1, wherein the nanocomposite material has a surface resistivity ranging from about $0.1 \times 10^4$ Ω/sq to about $1 \times 10^8$ Ω/sq and a surface energy ranging from about 19 mN/m$^2$ to about 24 mN/m$^2$.

8. The member of claim 1, wherein the nanocomposite material has a tensile strength ranging from about 600 psi to about 5000 psi; a toughness ranging from about 1000 in·lbf/in$^3$ to about 5000 in·lbf/in$^3$; or a percentage ultimate strain ranging from about 100% to about 600%.

9. The member of claim 1, wherein the fluoroelastomer matrix comprises at least one fluoroelastomer comprising a curing site monomer and a monomeric repeating unit selected from the group consisting of a vinylidene fluoride, a hexafluoropropylene, a tetrafluoroethylene, a perfluoro(methyl vinyl ether), a perfluoro(propyl vinyl ether), a perfluoro(ethyl vinyl ether), and a combination thereof.

10. The member of claim 1, wherein the fluoroelastomer matrix comprises a vinylidene fluoride-containing fluoroelastomer cross-linked with a curing agent selected from a group consisting of a bisphenol compound, a diamino compound, an aminophenol compound, an amino-siloxane compound, an amino-silane, phenol-silane compound, and a combination thereof.

11. The member of claim 1, wherein the substrate is formed of a material selected from the group consisting of a metal, a plastic, a ceramic, and a combination thereof, wherein the metal comprises a material selected from the group consisting of an aluminum, an anodized aluminum, a steel, a nickel, a copper, and a mixture thereof, and wherein the plastic comprises a material selected from the group consisting of a polyimide, a polyester, a polyetheretherketone (PEEK), a poly(arylene ether), a polyamide, and a mixture thereof.

12. The member of claim 1, wherein the plurality of INFs comprises a surface modified with a mixture of a polydimethylsiloxane and at least one of a perfluorocarbon and a perfluoropolyether.

13. A fuser member comprising:
an outermost layer disposed over a substrate, the outermost layer comprising:
a plurality of carbon nanotubes (CNTs) and a plurality of inorganic nano-fillers (INFs) disposed in a fluoroelastomer matrix, wherein the plurality of CNTs is present in an amount ranging from about 0.1% to about 25% and the plurality of INFs is present in an amount ranging from about 1% to about 80% by weight of the total outermost layer, wherein the INFs are selected from the group consisting of silicon carbides, boron nitrides, boron carbides, aluminum nitrides, titanium nitrides, titanium carbides, zirconium carbides, and combinations thereof, and wherein each of the plurality of INFs comprises a surface modified with a mixture of two or more of a perfluorocarbon, a perfluoropolyether, or a polydimethylsiloxane.

14. The member of claim 13, wherein the outermost layer has a thickness ranging from about 5 microns to about 100 microns.

15. The member of claim 13, wherein the outermost layer has one or more properties comprising a thermal conductivity ranging from about 0.1 W/m·K to about 6 W/m·K; a surface energy ranging from about 18 mN/m$^2$ to about 25 mN/m$^2$; a surface energy ranging from about 19 mN/m$^2$ to about 24 mN/m$^2$; a tensile strength ranging from about 600 psi to about 5000 psi; a toughness ranging from about 1000 in·lbf/in$^3$ to about 5000 in·lbf/in$^3$; and a percentage ultimate strain ranging from about 100% to about 600%.

16. The member of claim 13, wherein the substrate is a cylinder, a roller, a drum, a belt, a plate, a film, a sheet, or a drelt.

17. A fusing system comprising the fuser member of claim 13, wherein the fusing system further comprises a backup member configured in contact with the fuser member for a print medium with unfixed toner images to pass through and fixing the unfixed toner images on the print medium.

18. A method of making a fuser member comprising:

forming a first nanocomposite comprising a plurality of carbon nanotubes (CNTs) uniformly dispersed in a fluoroelastomer;

forming a second nanocomposite by compounding the first nanocomposite with one or more of the fluoroelastomer, a plurality of CNTs, and a plurality of inorganic nanofillers (INFs) such that the plurality of CNTs and the plurality of INFs are uniformly dispersed in the fluoroelastomer and have a controllable concentration;

forming a composite dispersion by dissolving the second nanocomposite in an effective solvent together with one or more of a corresponding curing agent, a metal oxide, and a surfactant;

applying the composite dispersion to a surface; and curing the applied composite dispersion to form a coating layer on the surface such that the coating layer comprises the plurality of CNTs ranging from about 0.1% to about 25% by weight, and the plurality of INFs ranging from about 1% to about 80% by weight of the total coating layer, wherein the INFs are selected from the group consisting of silicon carbides, boron nitrides, boron carbides, aluminum nitrides, titanium nitrides, titanium carbides, zirconium carbides, and combinations thereof, and wherein each of the plurality of INFs comprises a surface modified with a mixture of two or more of a perfluorocarbon, a perfluoropolyether, or a polydimethylsiloxane.

19. The method of claim 18, wherein the compounding step is carried out from about 1500 m·g torque to about 2400 m·g torque at a temperature ranging from about 120° C. to about 200° C.

20. The method of claim 18, wherein the coating layer has one or more properties comprising a thermal conductivity ranging from about 0.1 W/m·K to about 6 W/m·K; a toughness ranging from about 1000 in·lbf/in$^3$ to about 5000 in·lbf/in$^3$, and a surface energy ranging from about 18 mN/m$^2$ to about 25 mN/m$^2$, and wherein the one or more properties remain unchanged when the coating layer is heated to a temperature of about 160° C. or higher for about 30 minutes.

* * * * *